United States Patent Office 2,994,473
Patented Aug. 1, 1961

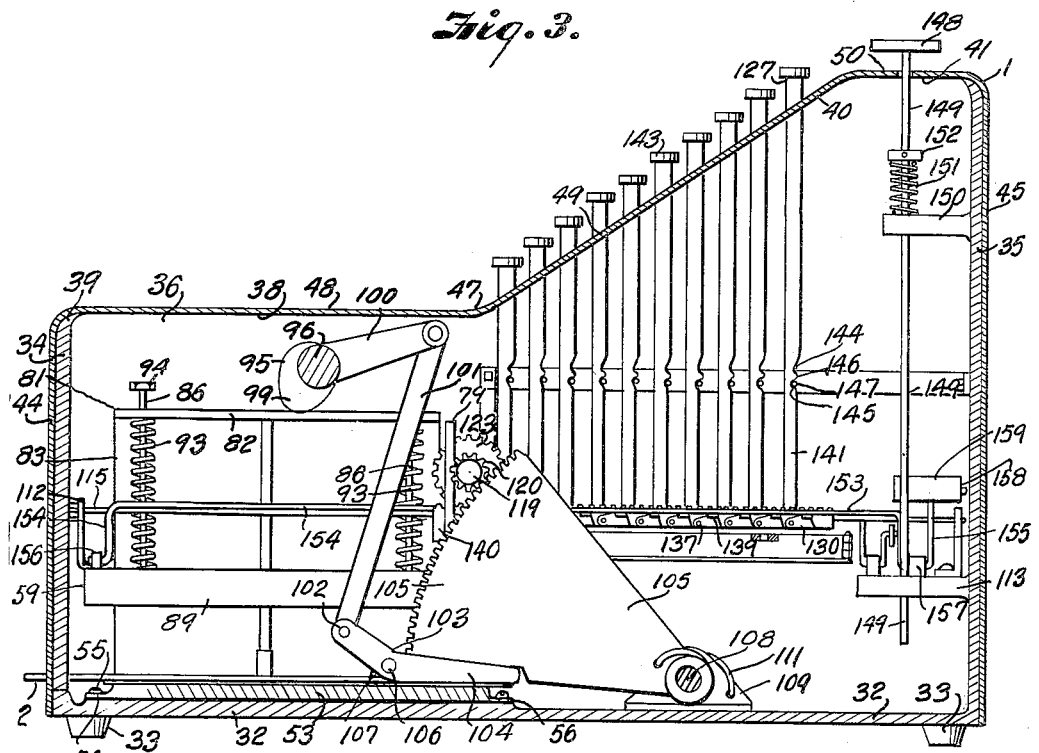
Fig. 3.
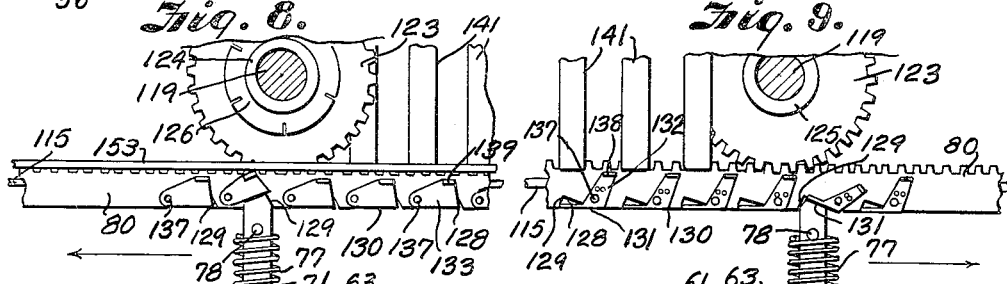
Fig. 8.   Fig. 9.
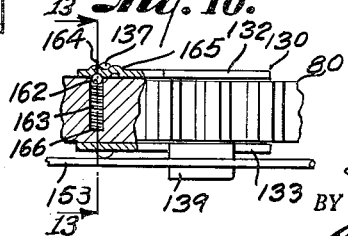
Fig. 10.
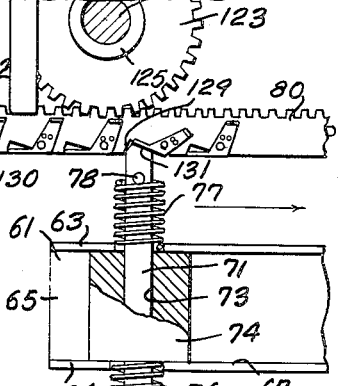
INVENTORS
Joseph M. Farmer and
Ray V. Smith
BY Paul E. Mullendore
ATTORNEY Aug. 1, 1961
J. M. FARMER ET AL 2,994,473
MACHINE FOR PUNCHING TABULATING CARDS IN CONNECTION WITH
CREDIT SALES INVOLVING A CHARGE PLATE
Filed Dec. 4, 1957
5 Sheets-Sheet 4
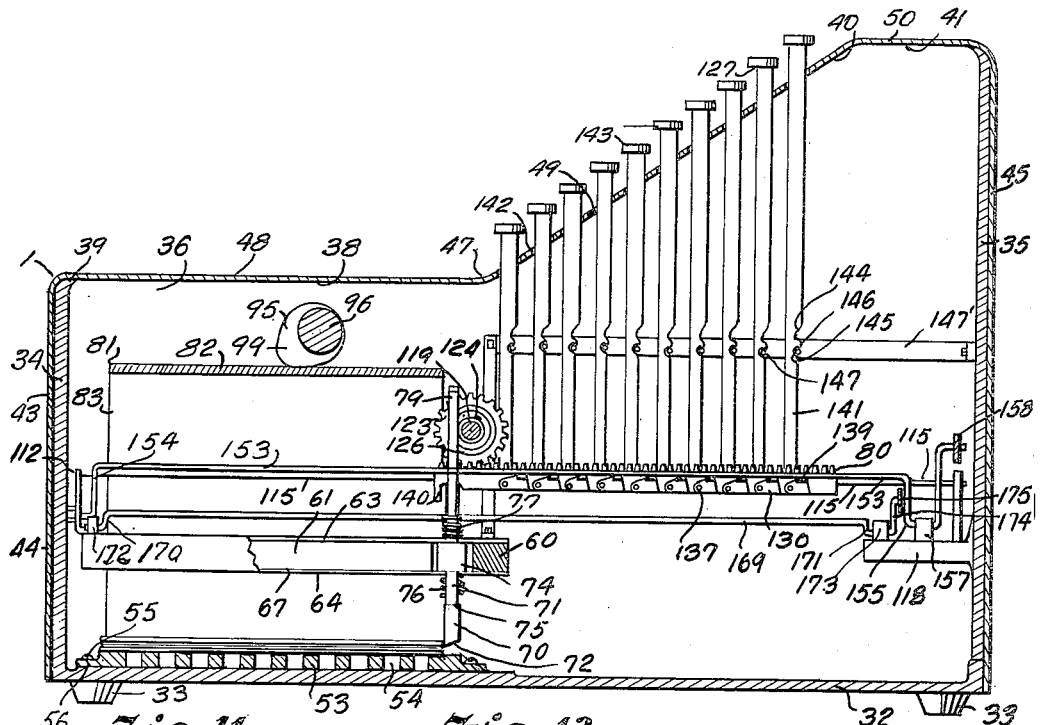
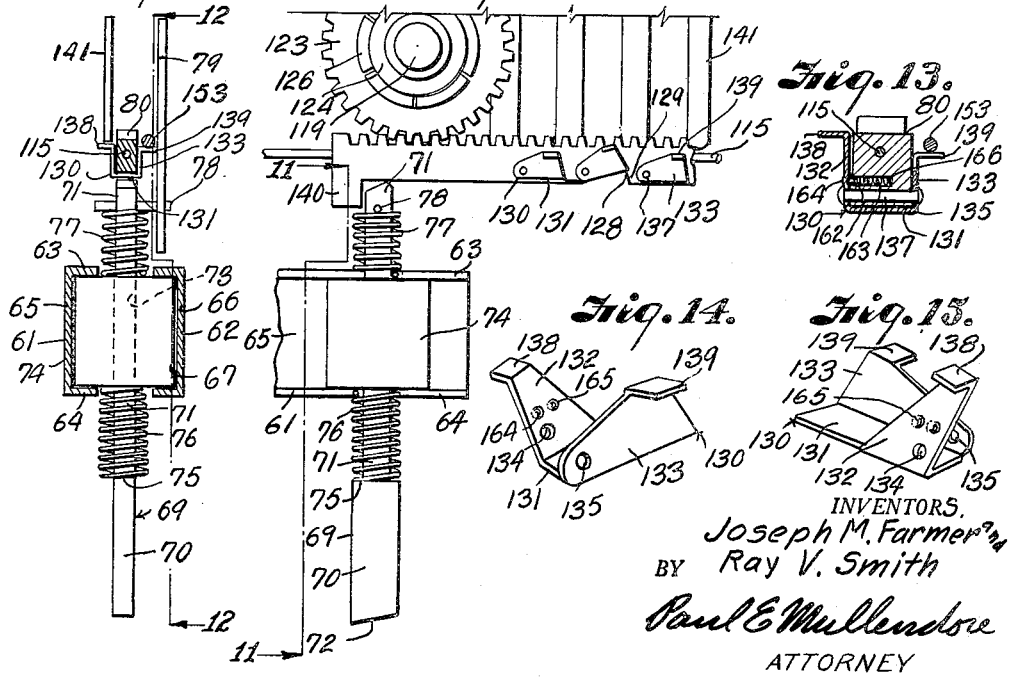
INVENTORS.
Joseph M. Farmer
BY Ray V. Smith
Paul E. Mullendore
ATTORNEY

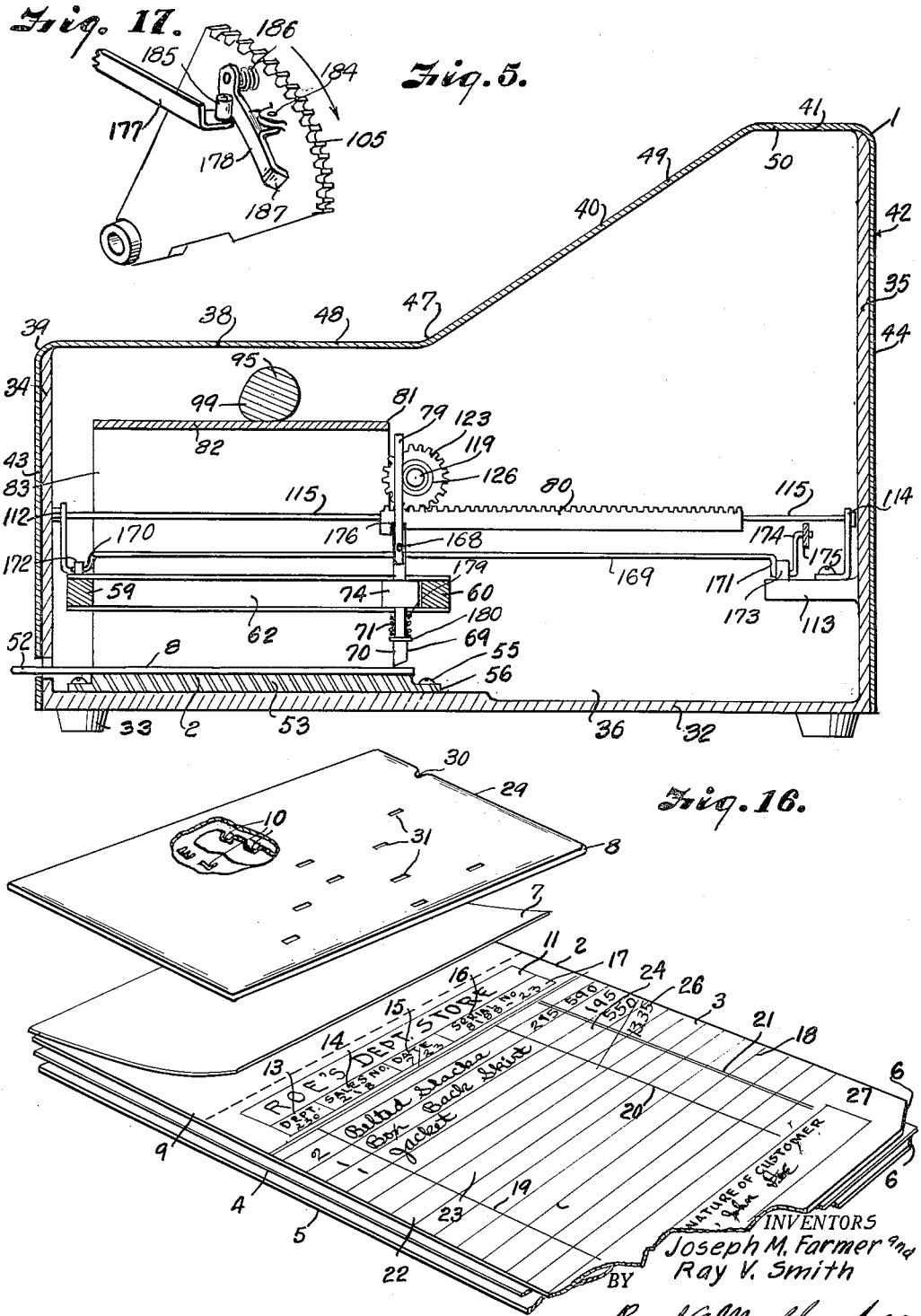

2,994,473
MACHINE FOR PUNCHING TABULATING CARDS IN CONNECTION WITH CREDIT SALES INVOLVING A CHARGE PLATE
Joseph M. Farmer, Parkville, Mo. (1401 Fairfax Trafficway, Kansas City 15, Kans.), and Ray V. Smith, 7132 Newton Drive, Overland Park, Kans.
Filed Dec. 4, 1957, Ser. No. 700,607
12 Claims. (Cl. 234—35)

This invention relates to a machine for use by a sales clerk to punch holes in a tabulating card in accordance with a customer's charge plate to identify the customer's account, and at the same time to punch holes indicating the amount, date, and other information of a sale, whereby the card is adapted for use without further processing in a sorting and tabulating machine.

At the present time, it is the practice for large business establishments, such as department stores, to provide their customers with identification means in the form of a charge plate. These plates have raised characters thereon showing the customer's name and address and perhaps an account number. When a purchase is made, the charge plate is presented to the clerk and the clerk inserts the charge plate into a press, along with the sales slip, whereby the characters on the plate are imprinted on the sales slip. One copy of the sales slip is given to the customer, and the original or a copy is passed to the credit department, where the data on the slip is transferred to a tabulating card for use in an automatic card sorting and tabulating machine. Thus at the end of a given period the cards may be automatically sorted and statements rendered to the customers. It is obvious that this procedure involves the possibility of error when copying the sales slip when preparing the tabulating card, consequently it is necessary to file both the sales slip and tabulating card for future reference in case verification of any detail of a transaction is required. Also, additional machines and help are required to produce the tabulating cards from the sales slips. It has been proposed to avoid mistakes by providing the clerk with a machine having type for printing sensing marks on a card that is placed in the press along with the charge plate and sales slip. The cards bearing the sensing marks are then sent to the accounting department, where they are inserted in a punching machine for punching holes therein in accordance with the sensing marks, so that the card is adapted for use in a sorting and tabulating machine. However, this procedure does not eliminate the sensing and punching machine so that the cards can be used in a sorting and tabulating machine.

It is, therefore, the principal object of the present invention to provide a relatively simple and inexpensive machine, adapted to be operated by the clerk, for punching holes in a tabulating card at the time the characters on the charge plate are applied to the sales slip. Another object is to provide a machine of this character for punching holes in the tabulating card corresponding with holes in a charge plate, to identify the customer information on the tabulating card and at the same time to punch holes indicating the amount of the sale, date, and other data regarding the sale.

Other objects of the invention are to provide a simple machine equipped with one set of punches adapted to be set up by means of keys, and a second set of punches that are set up in accordance with holes in a charge plate; to provide an actuating mechanism for operating both sets of punches simultaneously; to provide a machine with means for registering the charge slip and card to be punched whereby the holes identifying the customer's account are properly related to the holes indicating the amount and other information concerning a sale; to provide means for clearing the machine in case of a mistake in setting up of the punches; to provide means for holding the keys in depression to visually indicate the data which the clerk has set up and for which holes are to be punched in a tabulating card, so that the clerk will make a final check before the punches are operated; and to provide a machine wherein the parts are automatically returned to starting position after the punching operation takes place.

In accomplishing these and other objects of the invention as hereinafter pointed out, we have provided improved structure, the preferred form of which is illustrated in the accompanying drawings, wherein:

FIG. 3 is a longitudinal section through the machine on the line 3—3 of FIG. 2, particularly illustrating the actuating gear segment and mechanisms actuated thereby.

FIG. 4 is a similar section on the line 4—4 of FIG. 2 to illustrate one punch, the punch setting rack bar, and keys therefor, with the parts in retracted position.

FIG. 5 is a similar section, but taken on the line 5—5 of FIG. 2 to better illustrate one of the punches and rack bar for setting the punch to one of the holes in the charge plate.

FIG. 6 is a fragmentary view, partially in section, of one of the pinions for moving the punch shifting racks whereby a punch is moved to punching position.

FIG. 7 is a fragmentary view, partially in section, of the drive between the pinion shaft and the driving gear therefor.

FIG. 8 is an enlarged fragmentary view showing the key actuated selectors on one of the punch shifting rack bars, whereby the corresponding punch is caused to engage the bar and be shifted to a punching station.

FIG. 9 is a similar view, but viewed from the opposite side.

FIG. 10 is an enlarged fragmentary view of one of the rack bars and one of the selectors attached thereto, particularly showing the latch for holding the selector in its respective positions.

FIG. 11 is an enlarged section on the line 11—11 of FIG. 12, particularly illustrating a front view of one of the punches, the punch mounting block, and the guides for the block.

FIG. 12 is a section on the line 12—12 of FIG. 11 and showing the pinion for actuating the rack bar.

FIG. 13 is a cross section on the line 13—13 of FIG. 10.

FIG. 14 is a perspective view of one of the selectors.

FIG. 15 is a similar view of the selector from the opposite side thereof.

FIG. 16 is a perspective view of a charge plate, sales slip, carbons, and tabulating card, which are to be inserted in the machine.

FIG. 17 is a perspective view of the power transmitting gear segment.

Figure 1:
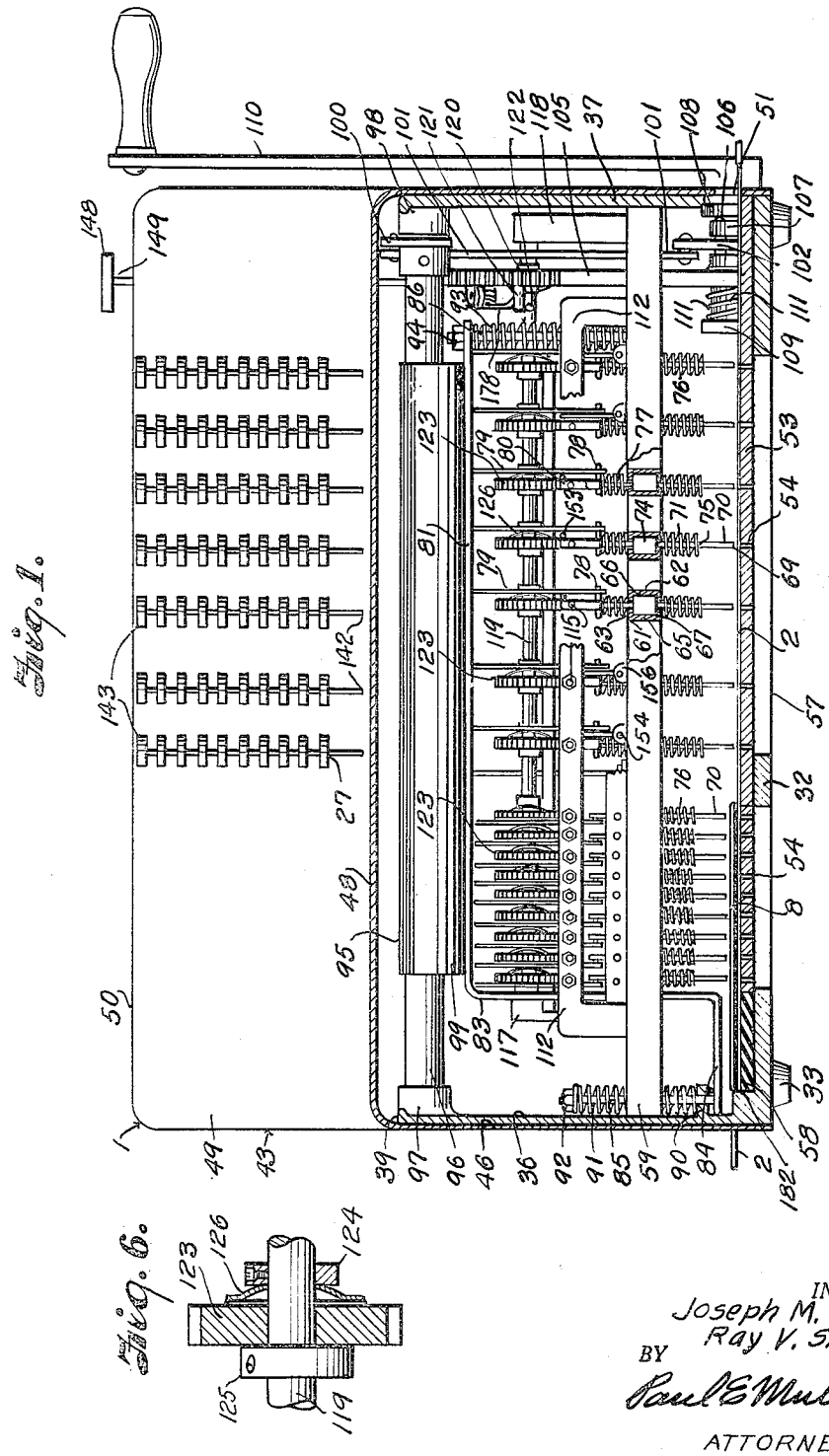
FIG. 1 is a transverse section through the front of a machine constructed in accordance with the present invention, the section being taken on the line 1—1 of FIG. 2.

Referring more in detail to the drawings:

1 designates a punching machine constructed in accordance with the present invention, for punching tabulating holes in a set of forms 2 and on which a sales person has previously recorded the details concerning a sale of merchandise or the like and from which the customer is charged and subsequently billed for payment. The set of forms illustrated in FIG. 16 includes a sales slip 3, a carbon sheet 4, and a tabulating card 5, all substantially conforming in size and shape to a standard tabulating card that is adapted for use in any sorting and tabulating machine. The set of forms also have a corner clipped therefrom as indicated at 6 for facilitating placement of the forms in the machine 1 and to later position the tabulating card in a sorting and tabulating machine. The set of forms also includes a smaller carbon sheet 7 that extends across the top of the sales slip 3 and conforms in size and shape to a charge plate 8. For convenience, the sets are preferably tipped together along one of their common edges in the manner of a snapout form. In this way, the sets of forms may be kept in the usual sales book and removed as an entirety for easy placement within the punching machine, as later described. The sales slip 3 is of substantially conventional design, in that it includes a space 9 located under the smaller carbon sheet 7 on which the customer's name and address, and, if desired, an account number, is printed by means of the embossed type portion 10 of the charge plate 8, the printing being effected in the space 9 of the sales slip and on a corresponding space of the tabulating card 5 by means of the carbon sheets 4 and 7. The sales slip also includes a panel 11 bearing the name 12 of the store, for example, Roe's Department Store, and blocks 13, 14, 15, 16 and 17 on which is indicated the number of the department, the sales number, date, serial number, and the sales person's number, respectively. Also provided on the sales slip is a series of transverse lines 18 that are traversed by lines 19, 20 and 21, forming a first column 22 to enter the quantity of items purchased, a wider column 23 in which is entered the names of the articles purchased, and columns 24 and 25 in which are entered, respectively the cost price per item and the sum price of the articles purchased and on which the amounts are totaled, as indicated at 26. At the bottom of the sales slip is a panel 27 for the signature of the customer. The set of forms may be provided with copies of the sales slip that are similarly printed, in which case a carbon sheet is included in the form above each copy sheet. The tabulating card may be similarly laid out if desired, although it is its prime purpose to carry the punch holes. To facilitate proper placement of the forms, one corner thereof may be sheered, as previously mentioned and indicated at 26, FIG. 2.

The charge plate 8 comprises a platelike body of rectangular shape and one edge 29 thereof is provided with a notch 30 by which the charge plate is registered in the punching machine, as later described. In addition to the type portions 10, the charge plate is provided with holes 31 that are punched therethrough to identify the customer's account and which are arranged in accordance with the holes of a tabulating card, whereby corresponding holes punched through a set of forms produces the exact arrangement of holes in the tabulating card 5.

The punching machine 1 provides a simple and inexpensive means for punching the identification holes in the card 5 of the forms and also the holes that are necessary for the charge and other data written upon the sales slip of the forms. This combination permits the practical punching of the tabulating card 5 by the sales clerk. The machine 1 includes a substantially flat base 32 that is provided on its under side with resilient feet 33. The base 32 is of generally rectangular shape and supports the frame of the machine. The frame has vertical front and back sides 34 and 35 connected by ends 36 and 37. The back side 35 is higher than the front side, as best shown in the cross sectional views, and the upper edges 38 of the sides extend from the upper edges 39 of the front side substantially parallel with the base to a point substantially midway of the ends, where they extend upwardly at an incline 40 to terminate in a horizontal portion 41 joining with the back side 35. The frame and base constitute support for the operating mechanisms of the machine and the frame and mechanisms are enclosed in a casing 42.

The casing 42 has front, rear and side walls 43—44 and 45—46 and a top 47, which includes a flat horizontal front portion 48, a rearwardly and upwardly inclined keyboard portion 49 joining with the rear wall 44 in a horizontal ledge portion 50. The side wall 46 is provided with a horizontal slot 51 located at a point sligthly above the base to pass a set of forms into the machine, and the front wall 43 is provided with a similar slot 52 located in the end thereof nearest the side wall 45, the slots being horizontal at substantially the same level.

Mounted on the base and extending inwardly from the side wall 46 but terminating short of the side wall 45 is a die plate 53 having rows of holes 54 that extend in a fore-and-aft direction, with the first row spaced inwardly from the side wall 47 and the next four rows spaced therefrom and from each other equal distances apart, as best shown in FIG. 1. The next two rows are spaced a slightly greater distance, but they are spaced from each other according to the same spacing of the other of the rows. The remainder of the rows of apertures are grouped closer together at the inner end of the plate and are spaced apart according to the unit of spacing for the holes 31 in the charge plate 8. The latter rows are preferably nine in number. The holes in each of the rows are ten in number and are all equally spaced apart, as best shown in FIGS 4 and 5. Each hole is preferably of rectangular shape and conforms in size and shape to the openings punched in the usual tabulating cards.

The plate thus described is suitably anchored to the base 32 by fastening devices 55 (FIGS. 3 and 4) extending through flanges 56 in the sides of the plate. The base is preferably provided with an opening 57 (FIG. 1) coextensive with the holes in the die plate to discharge the cuttings produced by punches, as later described.

Fixed in the space between the end of the plate and the side wall 45 is a resilient pad 58 that registers with the portion of the charge plate 8 that carries the type portions 10.

Extending between the ends 36 and 37 of the frame and spaced above the plate 53 are horizontal bars 59 and 60 constituting supports for pairs of channel shaped guide rails 61 and 62. Each pair of guide rails is arranged with upper and lower flanges 63 and 64 turned inwardly in facing relation with the web portions 65 and 66 positioned vertically to cooperate with the flanges in providing a rectanguler guideway 67 above each of the rows of holes in the die plate 53. The inturned flanges 63 and 64 of the channels are spaced apart as indicated at 68 to pass punches 69.

The punches are to cooperate with the holes in the die plate to cut through the forms, and are best illustrated in FIGS. 11 and 12. Each punch includes a lower punch portion 70 having the cross sectional shape of the holes and an upper shank portion 71. The lower ends of the punch portions 70 are preferably formed on the slight bias 72, whereby when the punches are operated as later described, they start cuts at the forward edges and the sides cooperate with the sides of the die holes in producing sheer cuts that progress rearwardly until the cuts are completed by the rear edges cooperating with the rear edges of the holes to complete severance of the material constituting the forms. The shank portions 71 of the punches are slidably supported in openings 73 of individual guide blocks 74. The guide blocks are of a shape to fit closely within the ways formed by the pairs of guide rails. The shanks of the punches are preferably of smaller width than the punch portions, to provide shoulders 75 for seating coil springs 76 which are sleeved on each shank and bear against the bottom of a respective guide block 74, as best shown in FIGS. 11 and 12. Also sleeved over each shank and bearing on the upper face of the guide block is a coil spring 77 having a different action than the lower springs. The springs are retained in compression by transverse pins 78 which are fixed rigidly to the upper ends of the shanks. Each pin 78 supports an offset upward shank extension 79. The extensions 79 are to provide for the location of punch transfer rack bars 80 directly over the shanks 71 of the punches. When the punches are in inactive position, they are all carried in rearwardly spaced relation with the rearmost holes of the die plate, with the shank extensions 79 out of registry with a ram 81 by which the punches are caused to penetrate the forms, as later described.

The ram 81 constitutes a plate portion 82 that is supported over the die plate 53 and which terminates at the lefthand end (FIG. 1) in a depending leg portion 83 that has a laterally extending plate portion 84 to cooperate with the resilient pad 58 in printing the type portions 10 of a charge plate 8, as later described. The ram is supported for vertical reciprocatory movement on pairs of posts 85 and 86. The posts 86 are carried on a transverse bar 89 that connects the bars 59 and 60 at the righthand side of the machine and which extends through suitable openings in that end of the plate portion 82. The posts 85 are carried directly upon the plate portion 84 of the ram and are slidably guided in ears 90 projecting inwardly from the end frame member 36 (FIG. 1).

Coil springs 91 are seated on the ears and have their upper ends bearing against nuts 92 that are threaded onto the upper ends of the posts 85. Coil springs 93 are also mounted on the other pair of posts 86 to seat on the cross bar 89 and to engage under the plate portion 82 of the ram, as best shown in FIG. 3. The latter springs are retained under compression by nuts 94 that are attached to the upper ends of the pins and bear against the upper side of the plate portion 82. The ram is thus supported upon the springs above the level of the upper ends of the shank portions 79. The ram is actuated in a downward direction and against action of the springs to push any of the punches, that may have been moved under the ram, through the set of forms and to effect impression of the type portions 10 of the charge plate 8. This movement is effected by an elongated cam 95 that is fixed on a shaft 96. The ends of the shaft are journaled in bearings 97—98 projecting inwardly from the end members 36 and 37 of the frame, as best shown in FIG. 1. The cam has a high lobe portion 99 adapted to be moved into pressing contact with the ram when the shaft is rotated in an anti-clockwise direction (FIG. 3). The shaft 96 is actuated by a rocker arm 100 thereon, that is connected by a link 101 with an arm 102 of a bell crank lever 103, the other arm 104 of which is adapted to be engaged by a gear segment 105. The bell crank lever 103 is pivotally mounted on a pin 106 that is carried between ears 107 which project upwardly from the die plate 53 (see FIGS. 1 and 3). The gear segment 105 is mounted on a stub shaft 108 journaled in brackets 109 that are attached to the base 32, as best shown in FIG. 3. The stub shaft 108 projects outwardly through registering openings in the end frame member 37 and end of the casing to carry a crank 110. The crank 110 extends upwardly at the side of the casing and carries a laterally extending handle by which it may be moved downwardly to actuate the gear segment in a clockwise direction as viewed from that end of the machine. The gear segment is returned to idle position by means of a spring 111 coiled about the stub shaft and having one end engaging an adjacent bracket and its opposite end connected with the gear segment.

Mounted on the front bar 59 is an upwardly disposed longitudinal bar 112. Mounted on an inwardly extending ledge 113 on the rear side frame is a similar bar 114. Supported by the bars 112 and 114 directly above each pair of guide rails is a rod 115 for slidably mounting therein a toothed rack 80 and whereon the racks may be selectively moved from the rear of the machine forwardly over the set of forms to carry the type therewith, as now to be described.

Rotatably supported above the transverse bar 60 in brackets 117 and 118 that are carried thereon is a transverse shaft 119. Mounted on the end of the shaft and directly over the segment gear 105 is a pinion gear 120 that is loose on the shaft 119 but is adapted to be connected in driving relation therewith by means of a laterally extending pin 121 on the face of the pinion gear 120 engaging a radial pin 122 on the shaft, as shown in FIGS. 1 and 7. The teeth of the pinion gear 120 mesh with the teeth of the gear segment 105 so that when the gear segment is rotated by pulling the handle of the crank 110 forwardly, the lateral pin 121 engages the radial pin 122 to turn the pinion 120 in a clockwise direction. Loosely mounted on the shaft 119 and meshing with the teeth of the racks 80 are gears 123. The gears 123 are retained from lateral movement along the shaft between collars 124 and 125. The collars 125 provide backing for the gears 123, while the collars 124 provide backing for a friction disk 126 to exert driving force between the collars and the faces of the gears 123. The disks 126 have sufficient tension so that when the shaft 119 is rotated upon movement of the crank 110, the gears 123 will rotate to move the rack bars until the rack bars have reached the end of their movement to carry the punches 69 as set by selectors through keys 127 for the first six rack bars, beginning from the righthand side of the machine (FIG. 1).

Each of these rack bars has a series of V-shaped notches 128 formed in the lower edges thereof to form shoulders 129 adapted to engage the shanks of the punches, depending upon whether or not entrances to the notches are closed by the selectors 130. The selectors are best shown in FIGS 10, 13, 14 and 15. The selectors are all of like construction in that they have a web portion 131 and side wings 132 and 133. The side wings extend upwardly along the respective sides of the rack bars, while the web portion extends substantially horizontally to normally close the entrances to the notches 128. The forward ends of the side wings have apertures 134 and 135 that register with apertures 136 extending through the racks to pass pins 137. The wing 132 extends upwardly and forwardly of the wing 133, which extends backwardly along the web portion 131. Extending laterally from the tops of the wings are tabs or lugs 138 and 139.

The selectors have two positions, one closing their respective notches and the other where the web portions are raised to the bottom of the notches to expose the notches and particularly the shoulders 129 thereof. The forward end of each rack bar has a depending lug 140 overlapping on the forward side of the shank of the punch that is related thereto and which acts to return the punches to their original and inactive position upon retractive movement of the rack bars.

In order to actuate the selectors 130, each selector is related to a key 127 of the key bank previously referred to. Each key 127 has a depending end 141 located alongside the rack bar and which is adapted to engage a tab 138 of its related selector when the key is depressed to move the selector into the notch 128 related thereto. The shanks of the keys are suitably supported and guided in the casing with the upper ends extending through holes 142 in the inclined portion 40 of the casing. The upper ends of the keys 127 have buttons 143. The rear edges of the shanks of the keys have spaced notches 144 and 145 on the respective sides of a cam 146 and extending transversely of the machine is a series of wirelike rods 147. The ends of the rods are fixed to the end frame members 147', so that when a key is depressed the cam edge 146 springs the rod rearwardly over the face of the cam so that it snaps into the upper of the notches to hold the key in depressed position while other keys are being depressed to shift certain of the selectors. It is to be remembered that each key actuated unit includes only a single punch and one rack bar, but each rack bar has ten notches closed by ten selectors, and there are ten keys with the buttons 143 being numbered from "0" for the front key to "9" for the rearmost key (see FIG. 2).

Figure 2:
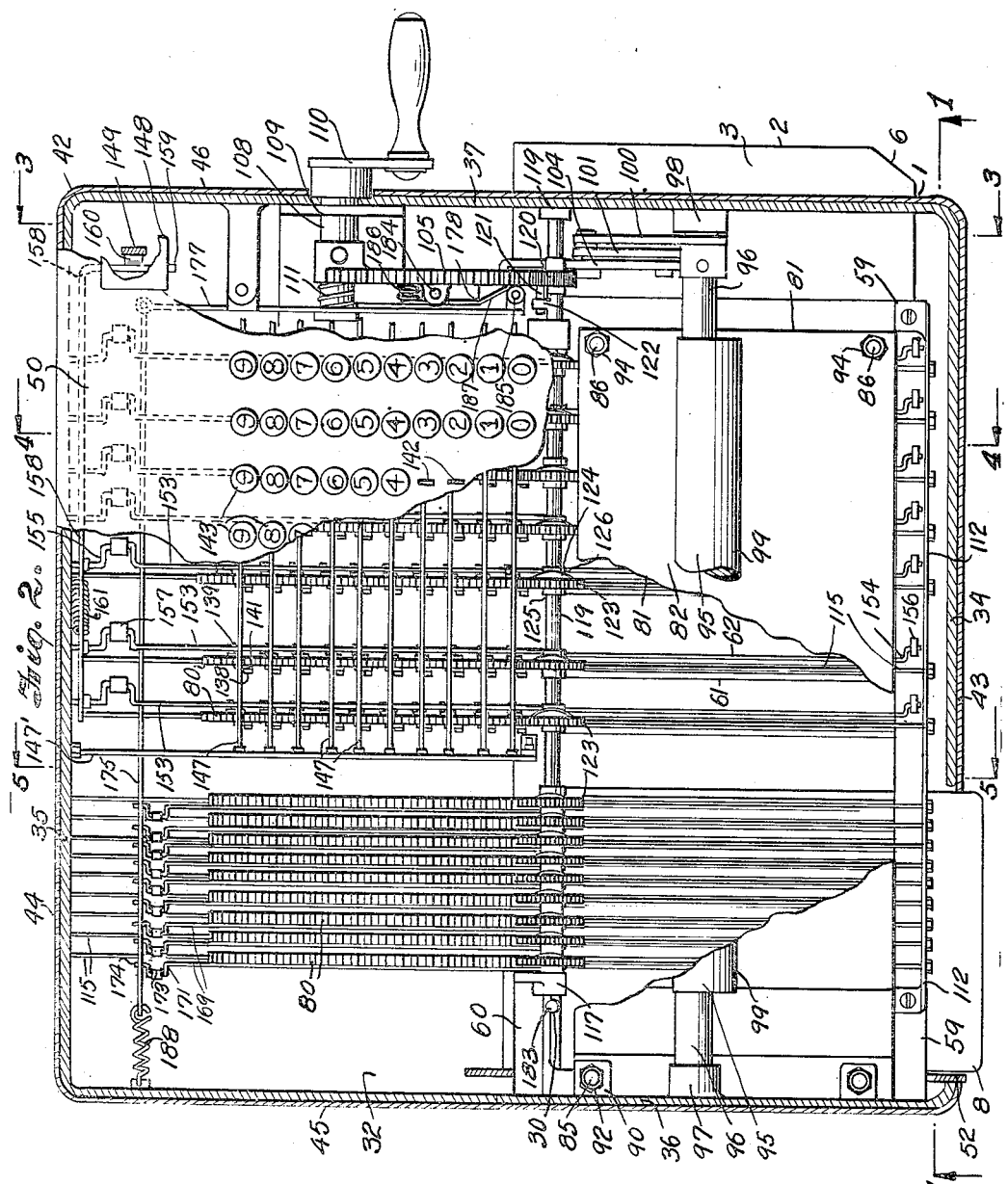
FIG. 2 is a partial plan view of the machine, with parts being broken away and shown in section to better illustrate the construction.

If, when setting up numbers, the wrong key has been pressed, all of the keys may be raised by means of a release button 148 on a key 149. The key 149 has a shank portion thereof slidable through the top of the casing and is guided in a lug 150 and in an opening in the ledge 113, previously described. The key 149 is retained yieldingly in its upper position by means of a coil spring 151 which is sleeved over the shank of the key and has its lower end seating upon the lug 150, while its upper end is engaging a collar 152 that is attached to the shank of the key (FIG. 3). Extending alongside of each rack and adapted to rock directly over the tabs 139 of the selectors are rods 153 having crank ends 154 and 155 that are journaled in lugs 156 and 157 carried, respectively, by the transverse bar 59 and the ledge 113, as best shown in FIG. 2. The portions of the rods that extend across the tabs 139 are, therefore, adapted to swing in an arc in the direction of the tabs to return any of the selectors, that have been raised, to their initial position and to cause the opposite tabs to lift the depressed keys. The rear ends of the rods are all connected with a link 158. The end of the link nearest the release key has a lateral arm 159 extending alongside the release key to engage a cam 160 thereon. By depressing the release key, the cam 160 shifts the link 158 against action of a spring 161 to rock the rods 153 downwardly and return all of the selectors to their original position where the web portions thereof close the entrances to the notches in the rack bars. The selectors are latched in their two positions on the rack bars by ball latches 162 pressed by springs 163 into one or the other recesses 164 and 165 in the wings 132. The springs 163 and ball latches 162 are retained in bores 166 of the rack bars (see FIGS. 10, 13, 14 and 15).

Assuming that the proper keys have been depressed, operation of the crank swings the segment gear 105 to rotate the shaft 119 through the drive pinion 120, which in turn rotates the pinion gears 123 to shift the rack bars 80 forwardly until an exposed shoulder 129 engages the upwardly projecting shank of a punch, whereupon the springs 77 on the punch will snap the key into position, where it is engaged by the shoulder 129, and continued movement of the rack bar will shift the punch and its guide block 74 therewith along the guide rails 61 and 62 until the racks reach the end of their travel.

The closely spaced units at the lefthand side of the machine (FIGS. 1 and 2) have guide rails, rack and pinion gears constructed and mounted in the same manner as the corresponding parts in the key actuated units. The shanks 79 of the punches are provided with laterally extending pins 168 supported by rods 169 having crank ends 170 and 171 journaled in bearings 172 and 173. The crank 171 includes an arm 174 that is connected with a link 175 which is reciprocated in one direction to raise the shanks of the punches into engagement with notches 176 on the under side of the rack bars, whereby when the shaft 119 is rotated, the pinions 123 on that end of the shaft move the rack bars forwardly to bring the punches 70 over the charge plate 8. At this time an arm 177 connected with the end of the link 175 is engaged by a cam 178 on the side of the gear segment. The punches then move along the surface of the charge plate until the punches drop into the holes 31. To provide for positive engagement of the punches with the holes 31, each of the punches is provided with a spring 179 having one end bearing against a collar 180 of the punch, and opposite ends bearing against the slide block 74. As soon as a punch engages in a hole 31 of the charge plate, the punch is stopped from further movement because the upper end of the shank of the punch has been freed from the notch 176 and the rack bar can continue its movement, leaving the punch in its set position. The punches also have offset extensions 79 that are adapted to be engaged by the ram plate 82 which when actuated pushes the punches through the portions of the forms underlying the charge plate to provide the forms with holes in exact conformance with the holes in the charge plate. On return movement of the operating crank 110, the pinions 123 rotate in reverse direction to retract the rack bars 80. The depending lug 140 on the forward end of each rack bar is of sufficient length to engage the upper ends of the shanks of the punches. Also at this time, the rods 169 have raised the punches out of the holes 31 in the charge plate, whereby the punches are carried with the rack bars to their inoperative position.

In order that a set of forms may be properly positioned when inserted through the slot 51, the pass therefor is provided with a stop 182 that extends parallel with the slot 51 to form an abutment against which the set of forms engage when they are in proper position. The charge plate is positioned by the notch 30 thereof engaging a pin 183 (see FIG. 2).

The cam 178 is pivotally mounted on the side of the gear segment 105 as indicated at 184, so that a roller 185 on the end of the arm 177 will pass under the cam 178 upon return rocking movement of the gear segment and the roller will ride along the face of the segment and rock the forward end of the cam outwardly to permit the roller 185 to be again located at the forward end of the cam. As long as the roller is in contact with the face of the segment, the punches are lifted by the rods 169, but when the roller rides up and along the cam, the rods 169 are actuated thereby to lower the seeking punches while they are being carried across the face of the charge plate. The cam 178 is controlled on its pivot by a spring 186 which keeps the ramp end 187 of the cam normally in contact with the face of the gear segment (see FIG. 17).

The machine constructed and assembled as described is operated as follows:

The clerk will make out the information concerning the sale to a customer on the sales slip 3 of a set of forms 2. The number of the department, sales number, date, serial number and clerk's number will be entered as indicated at 13, 14, 15 and 16. The number and articles purchased, as well as the sales price, will be entered on the lines 18, and the amount of the sale totaled as indicated at 26. The customer will submit his charge plate to the clerk.

The clerk will place the set of forms into the machine through the slot 51 until the end thereof having the carbon sheet 7 abuts the stop 182. The charge plate is then inserted through the slot 52 with the edge of the charge plate moving along the stop 182 and the notch 30 engaging the pin 183. In this position, the punch holes 31 in the charge plate will register with holes 54 in the underlying portion of the die plate 53 (see FIG. 1).

The total amount of the sale will be set up, using the righthand bank of keys 127. For example, if the amount of the sale is, as illustrated, $13.35, the proper keys in the first four rows from the right will be actuated by pressing upon the buttons 143 to set up the amount of the sale in the machine. Keys 127 in the two rows to the left will be similarly depressed to set up the date or other code information pertaining to the sale. The crank 110 will then be drawn forwardly and downwardly to rock the gear segment 105 and cause rotation of the driving gear 120 in a clockwise direction as viewed from the righthand side of the machine. Turning of the shaft 119 is through the pin 121 engaging the pin 122. Rotation of the shaft 119 turns all of the gears 123 also in a clockwise direction as viewed from the righthand side of the machine, with the result that the racks 80 are shifted along their supporting rods 115 and over the charge plate 8 and set of forms 2.

The previous depression of keys has rocked the corresponding selectors 130 under those keys. Movement of the keys effected disengagement of the notches 145 in the stems thereof from the latch rods 47 and engaged them with the notches 144 to hold the keys in depressed position. During this movement, the key stems or shanks 141 pushed the ends thereof on the tabs 138 of the selectors to rock the selectors on their pivot pins 137. This movement of the selectors caused the web portions 131 to enter the notches 128, thereby exposing shoulders 129 in the rack bars. The selectors actuated are retained in the position to which they have been moved by the ball latches 162. This movement of the selectors brings the tabs 139 thereon into engagement with the rods 153. The rods are in their normal position, having sufficient room thereunder to permit movement of the selectors. Upon shifting of the rack bars, the depending lugs 140 thereof will leave the shanks 71 of the key controlled punches. When these rack bars have moved sufficiently so that a notch 128 opened up by an actuated selector 130 passes over the upper ends 71 of the shanks of the punches, the punches will lift under action of the spring 77 to be engaged by the shoulders 129. The shoulders 129 will then engage the punches and the punches will be carried along with the rack bars, since the slide blocks 74 will move along the guide rails 61 and 62.

The hole seeking punches at the opposite end of the machine will all start their movement with the beginning of the movement of the racks at that end of the machine, since the upper ends 71 of those punches are engaged in the notches 176 of those rack bars 80. The rack bars 80 at that end of the machine will carry the punches across the face of the charge plate until the punches drop into the punch holes 31 of the charge plate and out of the notches 176. This will stop further movement of the hole seeking punches, and the pinion gears 123 at that side of the machine will complete full movement of those rack bars.

The punches are lowered into contact with the charge plate because soon after starting movement of the crank handle, the roller 185 will ride up the cam track 178 on the gear segment 105 to rock the lever arm 177 and cause shifting of the link 175 to the right under and against action of the spring 188. This movement of the link 175 rocks all of the rods 169 downwardly away from the pins 168 (FIG. 5) so that the springs 71 bring the punches 70 at that end of the machine into sliding contact with the face of the charge plate, the movement of the rods 169 being sufficient to permit subsequent operation of the punches, as now to be described.

At the time the gear segment 105 is approaching the end of its stroke, the edge thereof engages the arm 104 of the bell crank lever 103 to rock the bell crank lever downwardly to swing the rocker arm 100 in a counter-clockwise direction through connection of the link 101. This brings the point 99 of the cam 95 into contact with the ram plate 82 (FIG. 3) and causes the ram plate to engage the shank extensions 79 and drive all of the punches downwardly through the sets of forms to punch out holes in the tabulating card corresponding with the punch holes in the charge plate, and to produce punch holes through the sales slip and tabulating card to be used in subsequent tabulating of the sale in a tabulating machine (not shown).

During end of the forward stroke of the gear segment 105, the roller 185 rides off the rear end of the cam 178 to restore action of the spring 188, which then tends to pull the link 175 to the left (FIG. 2) and to rock the lifting bars 169 into engagement with the pins 168. However, the punches at the lefthand side of the machine will remain depressed because they are held down by the cam 95.

Simultaneously with actuation of the ram plate, the depended portion 84 thereof presses the type portion of the charge plate into contact with the carbon sheet 7 to print the name, address and customer's number on the heading of the sales slip and the corresponding underlying portion of the tabulating card.

After the punching and printing operation, the crank 110 is released so that the spring 111 is effective in reversing the gear segment 105. As soon as the gear segment lifts from the arm 104, the coil springs 91 and 93 become effective to lift the ram plate, whereupon the stored up action in the spring 188 causes the rods 169 to lift the punches from the charge plate and support them during reverse movement of the rack bars. Simultaneously, the springs 77 on the sets of punches at the righthand side of the machine become effective in lifting the punches out of contact with the sales slip. During this action, the pinion gears 123 are idle, because of lost motion as the pin 121 is moving to the opposite side of the pin 122. As soon as the pin 121 again engages the pin 122, the gears 123 begin to rotate in reverse direction to return all of the rack bars to their original position. After the rack bars have returned to original position, the release key 148 is pushed downwardly to release the depressed keys and restore the position of the selectors. Pushing of the key 149 downwardly causes the cam 160 thereof to shift the link 158 to the right against action of the spring 161, thereby rocking the lift bars 153 downwardly against the raised tabs 139. This rocks the selectors to their original position, as shown in FIG. 4. During return of the selectors to their original position, the tabs 138 engage the ends of the latched keys to exert an upward force thereon, causing the notches 144 to move out of engagement with the latch rods 146 and bring the notches 145 into engagement with the latch rods. Upon release of pressure on the key 148, the rods 153 are lifted from contact with the tabs 139 of the selectors responsive to action of the spring 161.

The charge plate is removed from the machine through the slot 52, after which the set of forms is removed from the slot 51. The sales slip may be detached along with the carbon sheets. The sales slip and charge plate are handed to the customer and the tabulating card is retained by the clerk.

While a set of forms having only one sales slip is illustrated and described, it is obvious that additional sales slips and carbon sheets may be provided for further records if necessary.

After setting up the keys, if the clerk discovers that a wrong key has been depressed, the keys are readily restored to their original position by actuating the release key 148, after which the proper keys are depressed to set up the punches.

The tabulating cards thus produced are collected from the sales department and delivered to the auditing department or other agency where the tabulating cards may be run through a tabulating and sorting machine in the manner in which tabulating cards have heretofore been used.

From the foregoing, it is obvious that with the present invention, the clerk makes the tabulating card at the time the information on the charge plate is applied to the sales slip, consequently, the invention eliminates the necessity of subsequently preparing the tabulating cards from the sales slips. Thus the invention eliminates a complete step in handling tabulating cards, and avoids many mistakes which occur when the tabulating card is made from the sales slip, as is the practice prior to the present invention.

What we claim and desire to secure by Letters Patent is:

1. In a machine for punching a tabulating card while data on a charge plate is applied to a sales slip, the combination of means for supporting the tabulating card, sales slip and charge plate imposed one upon another with portions of the tabulating card and sales slip extending from the charge plate, means for punching the sales slip and tabulating card in accordance with punch holes in the charge plate, means for effecting printing of type elements of the charge plate on the sales slip, means for punching the extending portions of the tabulating card and sales slip, and means for simultaneously actuating said printing and said punching means.

2. A machine for punching a tabulating card while data on a charge plate is applied to a sales slip, said machine including die means for backing the tabulating card, sales slip and charge plate imposed one upon another with portions of the sales slip and tabulating card extending from one side of the charge plate, means for applying pressure upon the charge plate to apply printing to the sales slip, a set of punches for punching the sales slip and tabulating card in accordance with punch holes in the charge plate, a second set of punches for punching said extending portions of the sales slip and tabulating card in accordance with data pertaining to the sale recorded on the sales slip, means for movably supporting the punches in the machine, means for carrying the first set of punches over the portion of the die means supporting the charge plate and into registry with the holes therein to set up the first set of punches, means for moving the second set of punches into punching position over the portion of the die means supporting the extending portions of the sales slip and tabulating card, key actuated means for selecting and controlling movement of the second set of punches to set up said punches over the die means in conformance with said sales data, and means for actuating simultaneously the punches in said setup positions to punch through the sales slip and tabulating card and said pressure applying means to apply printing on the sales slip.

3. In a machine of the character described, a die plate for supporting a tabulating card, a sales slip and a charge plate imposed one upon the other, a ram plate reciprocably supported over the die plate and having a depending portion adapted to apply printing pressure on the charge plate, guides extending transversely intermediate the die and ram plates, a slide block carried by said guides, a punch reciprocable in the slide block, a toothed rack having a series of recesses on the under edge forming shoulders, selectors pivoted on the rack bar in covering relation with the recesses and having laterally extending tabs, keys having shanks positioned over each tab for moving any one of the selectors to expose the shoulder covered thereby, a pinion meshing with teeth of the rack bar to move the rack bar until an exposed shoulder engages the punch and to move the punch engaged thereby into punching position over the die plate, and means for actuating the ram to effect actuation of the punch and printing of the charge plate.

4. In a machine of the character described, a die plate for supporting a tabulating card, a sales slip and a charge plate imposed one upon the other, a ram plate reciprocably supported over the die plate and having a depending portion adapted to apply printing pressure on the charge plate, spaced apart guides extending transversely intermediate the die and ram plates, a slide block carried between said guides, a punch reciprocable in the slide block, a toothed rack having a series of recesses on the under edge forming shoulders, selectors pivoted on the rack bar in covering relation with the recesses and having laterally extending tabs, keys having shanks positioned over each tab for moving any one of the selectors to expose the shoulder, means for latching the keys in depressed position, a pinion meshing with the rack bar to move the rack bar until an exposed shoulder engages the punch and to move the punch engaged thereby into punching position over the die plate, means for actuating the ram to effect actuation of the punch relatively to the die plate, means on the rack bar for engaging the punch to return the punch on return of the rack bar, and means for releasing the selectors including the depressed key to clear the machine.

5. In a machine of the character described, a die plate for supporting a tabulating card, a sales slip and a charge plate imposed one upon the other, a ram plate reciprocably supported over the die plate and having a depending portion adapted to apply printing pressure on the charge plate, guides extending transversely intermediate the die and ram plates, a slide block carried by said guides, a punch reciprocable in the slide block, a toothed rack having a series of recesses on the under edge forming shoulders, selectors pivoted on the rack bar in covering relation with the recesses and having laterally extending tabs, keys having shanks positioned over each tab for moving any one of the selectors to expose the shoulder covered thereby, a pinion meshing with teeth of the rack bar to move the rack bar until an exposed shoulder engages the punch and to move the punch engaged thereby into punching position over the die plate, means for actuating the ram to effect actuation of the punch and printing of the charge plate, oscillatable means for rotating the pinion in one direction to position the punch and to operate the ram actuating means, and a lost motion connection between the pinion rotating means and the oscillating means operable upon return thereof to free the ram prior to starting return of the punch by said rack bar.

6. In a machine of the character described, a die plate for supporting a tabulating card, a sales slip and a charge plate imposed one upon the other, a ram plate reciprocably supported over the die plate and having a depending portion adapted to apply printing pressure on the charge plate, spaced apart guides extending transversely intermediate the die and ram plates, a slide block carried between said guides, a punch reciprocable in the slide block, a toothed rack having a series of recesses on the under edge forming shoulders, selectors pivoted on the rack bar in covering relation with the recesses and having laterally extending tabs, keys having shanks positioned over each tab for moving any one of the selectors to expose the shoulder, means for latching the keys in depressed position, a pinion meshing with the rack bar to move the rack bar until an exposed shoulder engages the punch and to move the punch engaged thereby into punching position over the die plate, means for actuating the ram to effect actuation of the punch relatively to the die plate, means on the rack bar for engaging the punch to return the punch on return of the rack bar, means for releasing the selectors including the depressed key to clear the machine, oscillatable means for rotating the pinion in one direction to position the punch and to operate the ram actuating means, and a lost motion connection between the pinion rotating means and the oscillating means operable upon return thereof to free the ram prior to starting return of the punch by said rack bar.

7. In a machine of the character described for punching a tabulating card in accordance with punch holes in a charge plate, means for supporting the charge plate superimposed over the tabulating card, guides extending transversely of the charge plate supporting means, slides on the guides, punches having stems freely reciprocable in the slides, means for reciprocating the slides on the guides to carry the punches across said supporting means to drop into the punch holes of the charge plate supported thereon and to return the punches to a first position, means for applying pressure on the stems of the punches for pushing the punches through the tabulating card, and means for lifting the punches from the holes of the tabulating card for return of the punches to said first position.

8. In a machine of the character described, a die plate for supporting a tabulating card and a charge plate imposed over the tabulating card, a ram plate reciprocably supported over the die plate, spaced apart guides extending transversely of the charge plate supporting means intermediate the die and ram plates, slide members carried by said guides, hole seeking punches reciprocable in each slide member, rack bars, means supporting the rack bars for reciprocable movement along the guides, a shaft, pinions on the shaft and having slip connections therewith for meshing with the rack bars to move the rack bars to carry the punches along said guides until the punches drop into punch holes in the charge plate, a drive gear on the shaft, a gear segment meshing with the drive gear, means for rocking the gear segment, means engageable by the gear segment for actuating the ram to effect actuation of the punches, a lost motion connection between the shaft and the drive gear to permit release of the ram prior to return of the rack bars, means for lifting the punches from the holes of the charge plate, and means for actuating the punch lifting means responsive to movement of the gear segment.

9. In a machine of the character described, a die plate for supporting a tabulating card and a sales slip imposed one upon the other with a charge plate imposed over a portion of the sales slip and tabulating card, a ram plate reciprocably supported over the die plate and having a depending portion adapted to apply printing pressure on the charge plate, a first set of spaced apart guides extending transversely of the charge plate supporting means intermediate portions of the die and ram plates which contain the charge plate therebetween, a second set of spaced apart guides extending transversely of the portions of the die and ram plate which contain the portions of the tabulating card and sales slip not covered by the charge plate, slide members carried by said guides, punches reciprocable in each slide member, rack bars, means supporting the rack bars for reciprocable movement along the guides, selectors pivoted on the rack bars which are movable along the second set of spaced apart guides, keys having shanks for actuating any one of the selectors of said last named rack bars, a shaft extending transversely of the rack bars, pinions on the shaft having slip connections therewith for meshing with each of the rack bars to move the rack bars to carry the punches along said guides into punching positions, a drive gear on the shaft, a gear segment meshing with the drive gear, means for rocking the gear segment, means engageable by the gear segment for actuating the ram to effect actuation of the punches and printing by the charge plate, a lost motion connection between the shaft and the drive gear to permit release of the ram prior to return of the rack bars, means for lifting the punches related to the first set of guides from the holes of the charge plate, and means for actuating the punch lifting means responsive to movement of the gear segment.

10. In a machine of the character described, a die plate for supporting a tabulating card, a sales slip imposed one upon the other with a charge plate imposed over a portion of the sales slip, a ram plate reciprocably supported over the die plate and having a depending portion adapted to apply printing pressure on a portion of the charge plate, a first set of spaced apart guides extending transversely under the ram plate and over the portion of the die and plate which supports the charge plate, a second set of spaced apart guides extending under the ram plate and over the portion of the die plate that supports the portion of the sales slip not covered by the tabulating card, slide blocks carried by said guides, hole seeking punches reciprocable in each slide block carried by the first set of guides, rack bars, means supporting the racks bars for reciprocable movement along the guides, selectors pivoted on the rack bars which are movable along the second set of spaced apart guides, keys having shanks for actuating any one of the selectors of said last named rack bars, a shaft, pinions on the shaft for meshing with each of the rack bars to move the rack bars to carry the punches along said guides into punching positions, a gear on the shaft, a gear segment meshing with the gear, means engageable by the gear segment for actutaing the ram to effect actuation of the punches and printing by the charge plate, and a lost motion connection between the shaft and the gear to permit release of the ram prior to return of the rack bars.

11. In a machine of the character described, a die plate for supporting a tabulating card, a sales slip imposed one upon the other with a charge plate imposed over a portion of the sales slip, a ram plate reciprocably supported over the die plate and having a depending portion adapted to apply printing pressure on a portion of the charge plate, a first set of spaced apart guides extending across the portion of the die plate that supports the charge plate, a second set of spaced apart guides extending across the portion of the die plate which carries the portion of the sales slip not covered by the charge plate, slide members carried by said guides, punches reciprocable in each slide member, rack bars, means supporting the rack bars for reciprocable movement along the guides, selectors pivoted on the rack bars which are movable along the second set of spaced apart guides, keys having shanks for actuating any one of the selectors of said last named rack bars, means for latching the keys, a shaft extending transversely of the rack bars, pinions on the shaft having slip connections therewith for meshing with each of the rack bars to move the rack bars to carry the punches along said guides into punching positions, a drive gear on the shaft, a gear segment meshing with the drive gear, means for rocking the gear segment, means engageable by the gear segment for actuating the ram to effect actuation of the punches and printing by the charge plate, a lost motion connection between the shaft and the drive gear to permit release of the ram prior to return of the rack bars, means for lifting the punches related to the first set of guides from the holes of the charge plate, means for actuating the punch lifting means responsive to movement of the gear segment, and means for returning the selectors to their original position and to release the keys from said latch means.

12. A machine for simultaneously making a tabulating card for use in automatic accounting machines with the recording of identifying indicia of a charge plate on a sales slip bearing cost and items involved in a sale, said machine including means for supporting a tabulating card and sales slip imposed one upon the other and the charge plate imposed upon one end of the sales slip, said charge plate having type elements thereon and an arrangement of holes therein identifying the customer, a set of punches, means for shifting selected punches over the portion of the supporting means which carries the imposed portions of the sales slip and tabulating card, a second set of punches, means for moving the second set of punches over the portion of said means supporting the charge plate for selected punches to register with the holes in the charge plate, means for applying pressure on said type elements of the charge plate to print the sales slip, and means for actuating the pressure means and the selected punches of both sets to punch through the sales slip and tabulating card.

References Cited in the file of this patent

UNITED STATES PATENTS

| | | |
|---|---|---|
| 2,010,642 | Peirce | Aug. 6, 1935 |
| 2,110,854 | Fuller et al. | Mar. 15, 1938 |
| 2,134,815 | Elliott | Nov. 1, 1938 |
| 2,664,815 | Schuessler | Jan. 5, 1954 |
| 2,710,406 | Gollwitzer | June 7, 1955 |

FOREIGN PATENTS

| | | |
|---|---|---|
| 807,667 | France | Oct. 19, 1936 |